United States Patent [19]

Ohki et al.

[11] Patent Number: 4,689,673
[45] Date of Patent: Aug. 25, 1987

[54] MOVEMENT COMPENSATION PREDICTIVE ENCODER FOR A MOVING PICTURE SIGNAL WITH A REDUCED AMOUNT OF INFORMATION

[75] Inventors: Junichi Ohki; Akihiro Furukawa, both of Tokyo, Japan

[73] Assignee: NEC Corporation, Tokyo, Japan

[21] Appl. No.: 872,780

[22] Filed: Jun. 10, 1986

[30] Foreign Application Priority Data

Jun. 10, 1985 [JP] Japan ............................ 60-125433
Jun. 27, 1985 [JP] Japan ............................ 60-140972
Jun. 28, 1985 [JP] Japan ............................ 60-142270

[51] Int. Cl.⁴ .................................... H04N 7/137
[52] U.S. Cl. .............................. 358/136; 358/105
[58] Field of Search ............... 358/133, 135, 136, 105

[56] References Cited

U.S. PATENT DOCUMENTS

| 4,460,923 | 7/1984 | Hirano | 358/136 |
| 4,494,144 | 1/1985 | Brown | 358/133 |
| 4,575,756 | 3/1986 | Furukawa | 358/136 |
| 4,591,907 | 5/1986 | Catros | 358/136 |
| 4,636,862 | 1/1987 | Hatori | 358/105 |

Primary Examiner—Howard W. Britton
Attorney, Agent, or Firm—Sughrue, Mion, Zinn, Macpeak & Seas

[57] ABSTRACT

In a movement compensation predictive encoder, a vector detector (19) is supplied with a moving picture signal and produces a movement vector signal representative of at least one movement vector for each region of each frame. A picture analyzer (16) serves as a variation detector for detecting a variation in each region to produce a variation signal when the variation exceeds a predetermined threshold in one of the regions. The variation signal is used in giving a predetermined value, such as zero, to the above-mentioned at least one movement vector for that one of the regions. In place of the variation detector, a scene change detector can likewise be used to produce a scene change signal for giving a predetermined value to the movement vectors for a frame for which a scene change is detected. The scene change detector is preferably operable on a summation for each frame of results of evaluation for movement compensated prediction errors rather than, as in prior art, for differences between picture elements of two consecutive frames.

4 Claims, 9 Drawing Figures

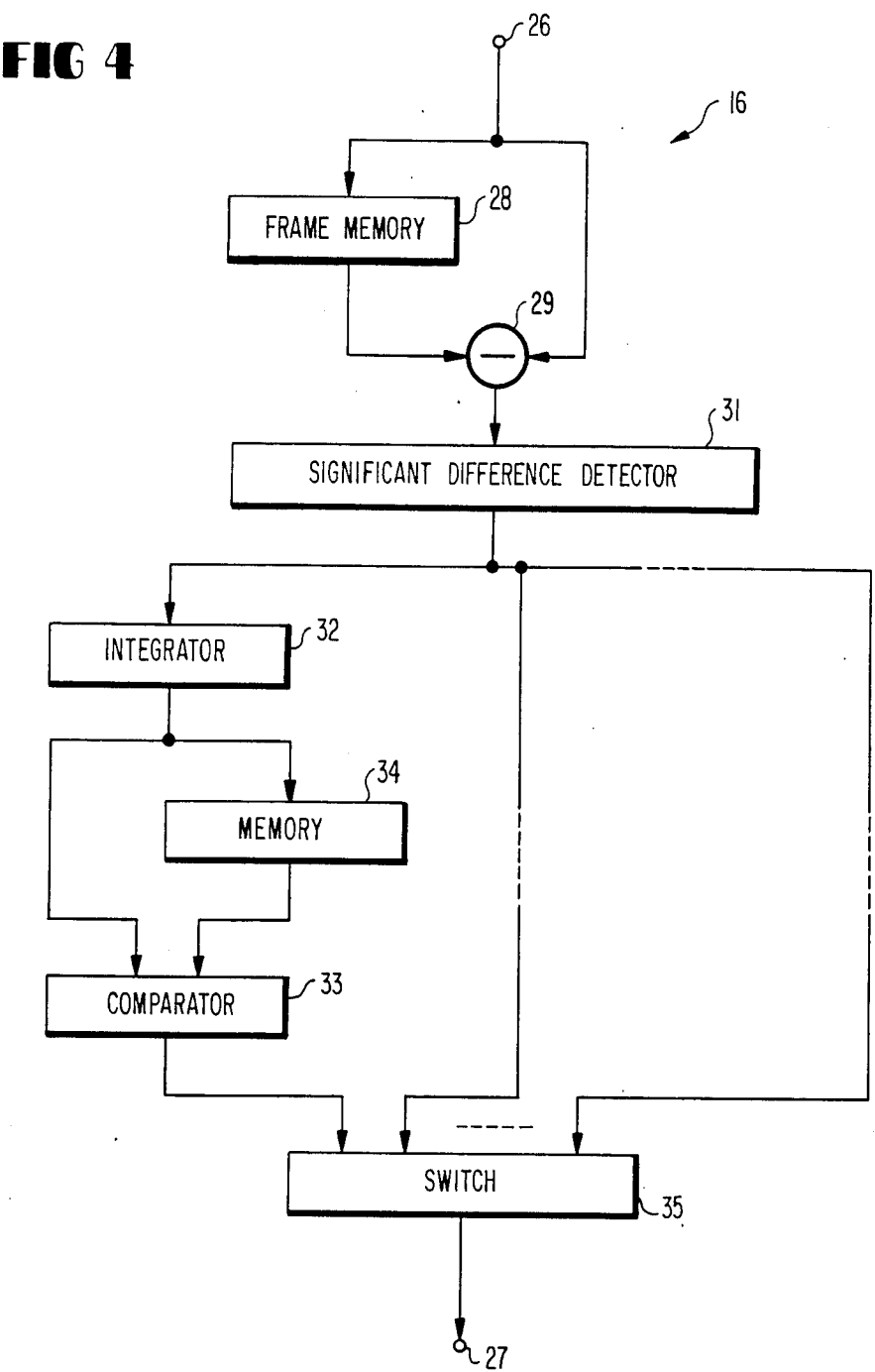

MOVEMENT COMPENSATION PREDICTIVE ENCODER FOR A MOVING PICTURE SIGNAL WITH A REDUCED AMOUNT OF INFORMATION

BACKGROUND OF THE INVENTION

This invention relates to a movement compensation predictive encoder for a moving picture signal and, more particularly, to a movement compensation interframe predictive encoder of the type described.

A movement compensation predictive encoder is already known. By way of example, one is disclosed in U.S. Pat. No. 4,460,923 issued to Akira Hirano et al and assigned to the present assignee. Such a movement compensation predictive encoder is used in digitally dealing with a moving picture signal either for delivery to a transmission channel or for storage on a recording medium. The moving picture signal is typically a television signal and comprises successive frames. When reproduced on a viewing screen, each frame shows an instantaneous picture. For each instantaneous picture, picture elements are represented by signal elements of the moving picture signal and are successively arranged along a scanning line with the scanning line swept substantially orthogonally to the line. As the case may be, the signal elements will be referred to herein as picture elements. Merely for brevity of description, it will be assumed throughout the following that the moving picture signal is delivered to a transmission channel as a movement compensation (interframe) predictive encoded signal rather than stored on a recording medium.

For movement compensation predictive encoding of a moving picture signal, a vector detector is used in detecting movement or motion vectors from the moving picture signal to produce a movement vector signal which successively indicates the movement vectors. In the manner which will later be described, each frame is divided on detecting the movement vectors into a predetermined number of blocks of picture elements. For example, a block consists of eight scanning lines and sixteen picture elements along each scanning line. For each block, the movement vector indicates a displacement from a previous frame to a current frame. Supplied with the moving picture signal and the vector signal, a predictive encoding circuit calculates a prediction error with movement compensation to produce a movement compensated prediction error signal consecutively indicative of such movement compensated prediction errors. Each movement compensated prediction error corresponds to a difference between the picture elements of the respective blocks which are related in the previous and the current frames by each movement vector. After quantized into a quantized error signal, the prediction error signal is fed to the transmission channel as the movement compensation predictive encoded signal. Before delivery to the transmission channel, codes of the movement compensation predictive encoded signal are usually subjected to variable length encoding.

On generating a moving picture signal, use is often made of a video effect technique such that a plurality of elementary pictures are reduced in size into reduced pictures and then edited in various manners into an instantaneous composite picture with each reduced picture positioned at a small region of the composite picture. Each region may consist of one or a plurality of blocks. Such composite pictures are represented by composite moving picture signal. Before reduced, each elementary picture is represented by an elementary moving picture signal. Each reduced picture may have no relation to other reduced pictures. Some regions may therefore monotonously move in successive composite pictures. Others may be subjected to considerable variations or changes. It is not seldom in this manner that the composite moving picture signal has statistical characteristics which vary from region to region in each composite picture.

Attention will be directed to that part of an instantaneous picture which is in each block and will now be called a block picture. The block picture may be a part of a composite picture. Alternatively, the block picture may be a part of a picture of a single varying scene. In any event, an interframe correlation is reduced to a very small value, if not entirely lost, when a wide variation takes place between the block pictures of the previous and the current frames. For a picture of a single scene, such a wide variation appears either when a television camera is switched to another camera to change the scene to another scene or when the television camera is panned.

When a wide variation occurs between two block pictures, the movement vector signal indicates a movement vector which does not converge to a finite vector but diverges. In other words, the movement vector becomes an erroneous movement vector which does not comply with an actual movement of the block between the previous and the current frames. When such an erroneous movement vector is used, it is impossible to compensate for the movement. An objectionable increase results in an amount of information carried by the movement compensation predictive encoded signal. This means a reduced encoding efficiency and results in a reduced rate of band compression. Furthermore, the erroneous movement vector degrades the quality of reproduced pictures.

In the manner described above, a wide variation occurs between two block pictures not only on panning of a television camera but also upon occurrence of a scene change from a previous scene to a current scene. Whenever a scene change takes place, the amount of information becomes very excessive. It has, however, been impossible to correctly discriminate the scene change from the panning of a television camera or a wide variation which results from a very quick movement of a picture portion.

SUMMARY OF THE INVENTION

It is therefore an object of the present invention to provide a movement compensation predictive encoder for use in encoding a moving picture signal with a reduced amount of information even for that part of the moving picture signal which represents a quick movement.

It is another object of this invention to provide a movement compensation predictive encoder of the type described, which has a high encoding efficiency.

It is still another object of this invention to provide a movement compensation predictive encoder of the type described, which has a high rate of band compression.

It is yet another object of this invention to provide a movement compensation predictive encoder of the type described and capable of producing a movement compensation predictive encoded signal which can be reproduced with an improved picture quality.

It is an additional object of this invention to provide a movement compensation predictive encoder of the type described, in which a scene change is detected without fail.

Other objects of this invention will become clear as the description proceeds.

According to this invention, there is provided a movement compensation interframe predictive encoder for a moving picture signal comprising successive frames, each consisting of a predetermined number of regions of picture elements. The encoder includes vector signal producing means responsive to the moving picture signal for producing a movement vector signal representative of at least one movement vector for each region and encoding means for encoding the moving picture signal into a movement compensation interframe predictive encoded signal and is characterised by: variation detecting means responsive to the moving picture signal for detecting a variation in each region from a previous frame to a current frame to produce a variation signal whenever the variation exceeds a predetermined threshold for one of the regions of the current frame, and controlling means coupled to the vector signal producing means and responsive to the variation signal for controlling the movement vector signal by giving a predetermined value to each movement vector in the above-mentioned one of the regions.

According to this invention, there is also provided a movement compensation interframe predictive encoder for a moving picture signal comprising successive frames, each comprising picture elements. The encoder includes vector signal producing means responsive to the moving picture signal for producing a movement vector signal successively representative of movement vectors for each frame and encoding means for encoding the movement vector signal into a movement compensation interframe predictive encoded signal and is characterised by: scene change detecting means responsive to the moving picture signal for detecting a scene change in one of the successive frames to produce a scene change signal whenever the scene change is detected, and controlling means coupled to the vector signal producing means and responsive to the scene change signal for controlling the movement vector signal by giving a predetermined value to each movement vector for the above-mentioned one of the successive frames.

BRIEF DESCRIPTION OF THE DRAWING

FIG. 4 is a block diagram of a picture analyzer for use in the encoder illustrated in FIG. 3;

DESCRIPTION OF THE PREFERRED EMBODIMENTS

Figure 1:
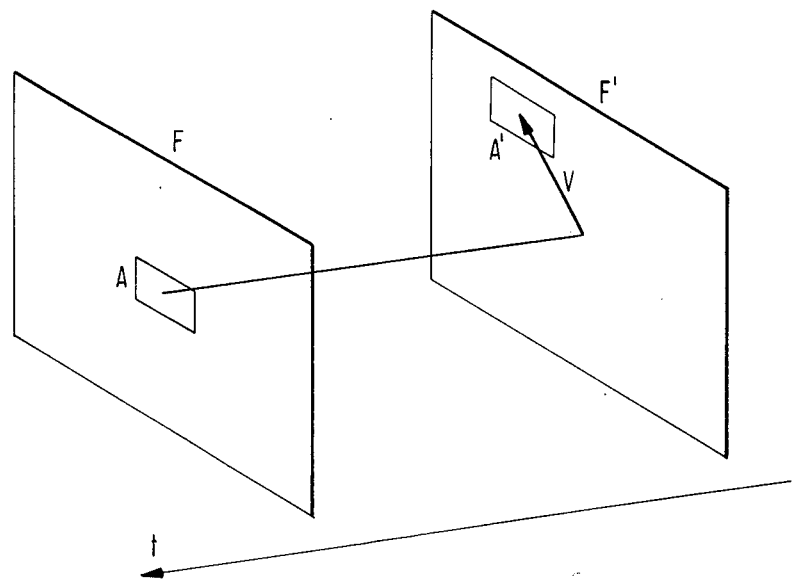
FIG. 1 is a schematic diagram for use in describing a movement vector.

Referring to FIG. 1, a movement or motion vector will be described at first in connection with a television signal or a like moving picture signal which comprises successive frames. A current frame represents a current picture depicted at F. A next previous frame represents a previous picture F'. A time axis t runs orthogonally to the pictures F and F'. Like the picture elements and the signal elements noted heretobefore, the pictures F and F' will be called frames and denoted by the reference letters for the respective pictures depending on the circumstances.

Attention will be directed to a block of the current frame F. The block will be referred to as a particular block and indicated by A. A corresponding block A' is sought in the previous frame F'. The corresponding block A' should have a highest interframe correlation to the particlur block A among the blocks of the previous frame F'. The correlation can be evaluated by calculating a frame difference between each pair of corresponding picture elements in the previous and the current frames F' and F and by calculating a summation in each block either for the squares or for the absolute values of the frame differences.

The movement vector is defined by a vector V (printed in a usual letter rather than by a bold letter or an arrow over the usual letter) drawn from an orthogonal projection of the particular block A on the previous frame F' to the corresponding block A'. The movement vector is therefore identical with a displacement from the orthogonal projection to the corresponding block A', namely, a displacement of each block from a previous frame to a current frame.

Figure 2:
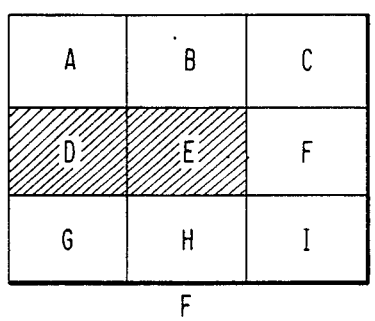
FIG. 2 is another schematic diagram and is for use in describing a video effect technique.

Turning to FIG. 2, reduced pictures in a composite picture will be described. As in FIG. 1, a current and a previous composite picture are exemplified at F and F'. It will be assumed that each composite picture consists of nine regularly arranged regions A (the same reference letter being used), B, C, D, E, F (the same reference letter being again used), G, H, and I and that a wide variation or change is present in each of the regions D and E between the reduced pictures of the previous and the current composite pictures F and F'. The wide variations are indicated by hatches drawn in the regions D and E of the current frame F.

Figure 3:
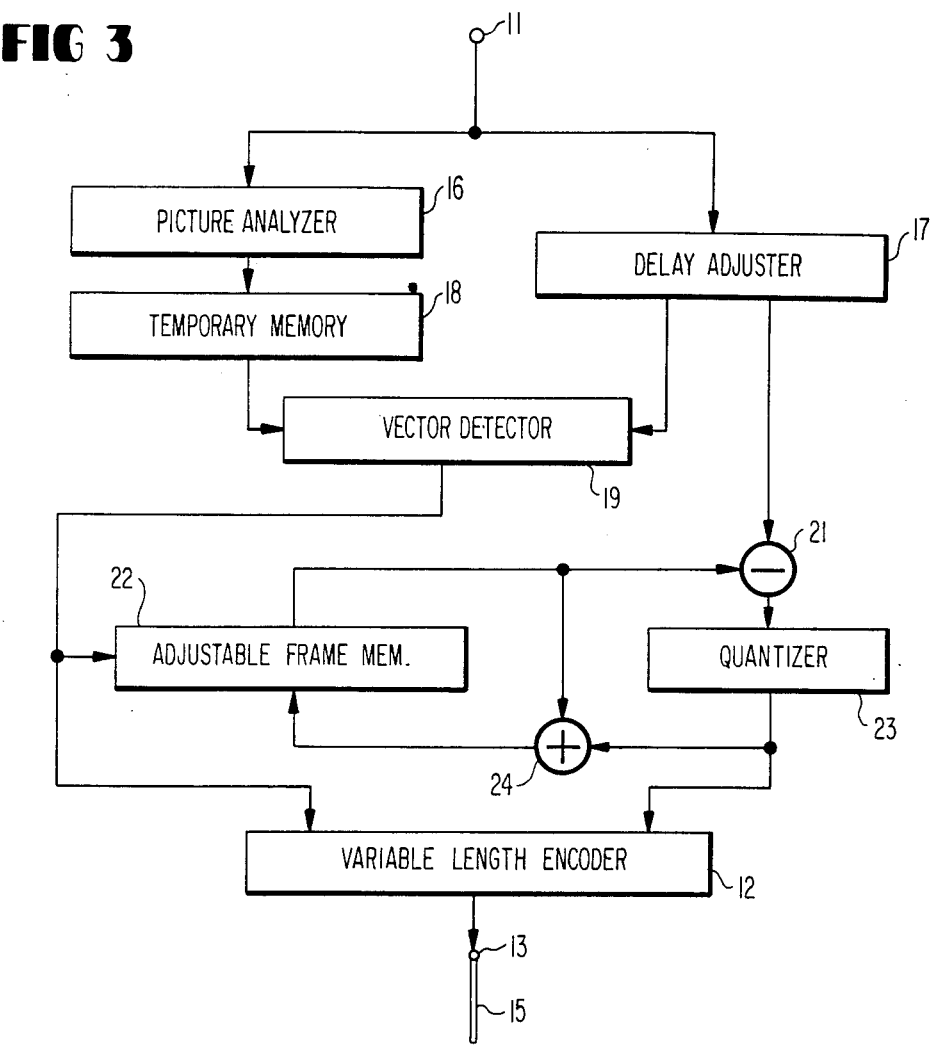
FIG. 3 is a block diagram of a movement compensation predictive encoder according to a first embodiment of the instant invention.

Referring now to FIG. 3, description will be given as regards a movement compensation (interframe) predictive encoder according to a first embodiment of the present invention. The encoder is for a moving picture signal which is given by a time sequence of picture signal elements and other control signal elements known in the art. The moving picture signal comprises successive frames and may include a signal part which represents a wide variation described in conjunction with FIG. 2. The moving picture signal may not be a composite picture signal but may be a moving picture signal which represents consecutive frames of a single varying scene.

The moving picture signal is supplied to an encoder input terminal 11 as an input picture signal. The encoder comprises a variable length encoding circuit 12 which supplies an encoder output terminal 13 with a variable length encoded signal representative of the moving picture signal in the manner which will later become clear. The variable length encoded signal is delivered to a transmission channel 15 of a certain transmission rate.

From the input terminal 11, the input picture signal is delivered to a picture analyzer 16 and a delay adjuster 17. In the manner which will later be described in detail, the picture analyzer 16 analyzes the input picture signal and detects a variation in each region of an instantaneous picture from a previous frame to a current frame. The picture analyzer 16 produces a variation signal which has a first and a second predetermined level when the variation exceeds a predetermined threshold and does not, respectively. The first and the second predetermined levels may be logic one and zero levels. The delay adjuster 17 will presently be described. The variation signal is delivered to a temporary memory 18 and is temporarily stored. The temporary memory 18 is for use in matching the variation signal with the input picture signal. It is therefore possible to understand that the temporary memory 18 produces a matched variation signal.

The delay adjuster 17 delivers a first delayed picture signal to a vector detector 19 with a delay which is equal to a sum of delays in the picture analyzer 16 and the temporary memory 18. The vector detector 19 is for detecting movement or motion vectors from the delayed picture signal to produce a movement vector signal indicative of the movement vectors. The vector detector 19 has any of known structures. An example of such vector detectors is described in an article contributed by Yuichi Ninomiya et al to Transactions of the Institute of Electronics and Communication Engineers of Japan, Volume J64-B, No. 1 (January 1983), pages 24 to 31, under the title of "Motion Compensated Prediction for Inter-Frame Coding Systems" according to the translation by the contributors.

Inasmuch as each movement vector represents the displacement described before in connection with FIG. 1, the movement vector signal indicates a displacement of each block from a previous frame to a current frame. The matched variation signal is supplied to the vector detector 19 as a control signal which controls the movement vector signal by giving a predetermined value, such as zero, to the displacement in that one of the regions in which the variation exceeds the predetermined threshold. More particularly, the vector detector 19 may read the variation signal stored in the temporary memory 18 as the matched variation signal on detecting the displacement for each region of the current frame. When the matched variation signal has the first predetermined level for that region, the vector detector 19 produces the movement vector signal with the predetermined value. Whenever the matched variation signal has the second predetermined level for the region under consideration, the vector detector 19 produces for the region in question the movement vector without change. It is now understood that a combination of the temporary memory 18 and a lead between the temporary memory 18 and the vector detector 19 serves as a controlling arrangement responsive to the variation signal produced by the picture analyzer 16 for controlling the movement signal by giving the predetermined value to the displacement of the block comprised by the region in question.

The delay adjuster 17 delivers a second delayed picture signal to a subtractor 21 with a delay which is equal to a sum of the above-mentioned sum and a delay in the vector detector 19. The movement vector signal is supplied to the variable length encoding circuit 12 and to an adjustable frame memory 22 as an adjusting signal. The frame memory 22 supplies the subtractor 21 with a movement compensation (interframe) predictive encoded signal with an adjustable delay to carry out movement compensation in the manner known in the art. The subtractor 21 subtracts the predictive encoded signal from the second delayed picture signal to deliver a movement compensated prediction error signal to a quantizer 23. The prediction error signal represents a movement compensated prediction error for each picture element. The quantizer 23 quintizes the prediction error signal into a quantized error signal, which is delivered to the variable length encoding circuit 12 and to an adder 24. In the quantized error signal, each prediction error is quantized into a quantized error.

The adder 24 calculates a sum of the quantized error signal supplied from the quantizer 23 and the predictive encoded signal supplied from the adjustable frame memory 22 to deliver a local decoded signal back to the frame memory 22. Responsive to the adjusting signal, the frame memory 22 gives the adjustable delay to the local decoded signal to produce the movement compensation predictive encoded signal. The variable length encoding circuit 12 is for encoding the movement vector signal supplied from the vector detector 19 and the quantized error signal supplied from the quantizer 23 together at an encoding rate into the variable length encoded signal which consists of Huffman codes known in the art or like variable length codes of a high efficiency. The variable length encoding circuit 12 furthermore carries out matching of the encoding rate with the transmission rate of the transmission channel 15 to deliver a rate matched signal to the transmission channel 15.

Turning to FIG. 4, the picture analyzer 16 has an analyzer input terminal 26 and an analyzer output terminal 27. The analyzer input terminal 26 is supplied with the input picture signal from the encoder input terminal 11 depicted in FIG. 3. The input picture signal is delivered to a frame memory 28 and a subtractor 29. The frame memory 28 supplies the subtractor 29 with a frame delayed picture signal in which the input picture signal is given a delay of one frame period. The subtractor 29 calculates a frame difference for each picture element between the input picture signal of a current frame and the delayed picture signal of a next previous frame to produce a difference signal which successively represents the frame differences calculated for the respective picture elements of the current frame. A combination of the frame memory 28 and the subtractor 29 therefore serves as an arrangement responsive to the input picture signal for producing the difference signal.

A significant difference detector 31 serves as a significance discriminator, which is a comparator for comparing the difference signal with a first prescribed threshold to produce a discrimination signal. When the difference exceeds the first prescribed threshold, the discrimination signal is given a first prescribed level. When the difference does not exceed the first prescribed threshold, the discrimination signal is given a second prescribed level. In this manner, the significant difference detector 31 discriminates between a significant and an insignificant difference as regards each frame difference to produce the discrimination signal which successively represents the significant and the insignificant differences for the picture elements of the current frame.

The picture analyzer 16 may comprise a plurality of circuit arrangements for the respective regions of each frame, such as the regions A through I illustrated with reference to FIG. 2. When the significant difference detector 31 discriminates between the significant and the insignificant differences for the region A, the discrimination signal is delivered to the circuit arrangement for the region A. Similarly, the discrimination signal is delivered to the respective circuit arrangements in a manner which will readily be implemented by one skilled in the art.

To speak more specifically of the circuit arrangement for the region A, the discrimination signal is delivered to an integrator 32 for integrating the first and the second prescribed levels of that part of the discrimination signal which is produced for the region A. The integrator 32 therefore serves as a summing circuit responsive to the discrimination signal for summing the significant and the insignificant differences into a summation for the region A to produce a summation signal representative of the summation for the region A of the current frame.

The summation signal is delivered to a comparator 33 and to a memory 34 for supplying the comparator 33 with the summation calculated for the region A of the previous frame. The comparator 33 is for comparing a second prescribed threshold with a difference between the summation for the region A of the current frame and the summation for the region A of the previous frame to supply a switch 35 with a partial signal which has the above-mentioned first and the second predetermined levels when the difference exceeds the second prescribed threshold and does not, respectively.

The switch 35 arranges the partial signals of the respective circuit arrangements into the above-mentioned variation signal for delivery to the temporary memory 18 described in conjunction with FIG. 3 through the analyzed output terminal 27. It will now be readily possible to select the first and the second prescribed thresholds so that the variation signal may have the first and the second predetermined levels when the variation exceeds the predetermined threshold and does not, respectively.

When operable at a high speed, a single circuit arrangement can be used for the circuit arrangements for the respective regions and put into operation in a time division fashion. It is now understood that either the single circuit arrangement or an assembly of the circuit arrangements for the respective regions and the switch 35 serves as a discriminating arrangement responsive to the summation signal successively representative of the summations for the respective regions of the successive frames for discriminating whether or not each summation exceeds a prescribed threshold which is determined in consideration of the predetermined threshold. The discriminating arrangement thereby produces the variation signal whenever the summation exceeds the last-mentioned prescribed threshold in one of the regions of the successive frames.

Figure 5:
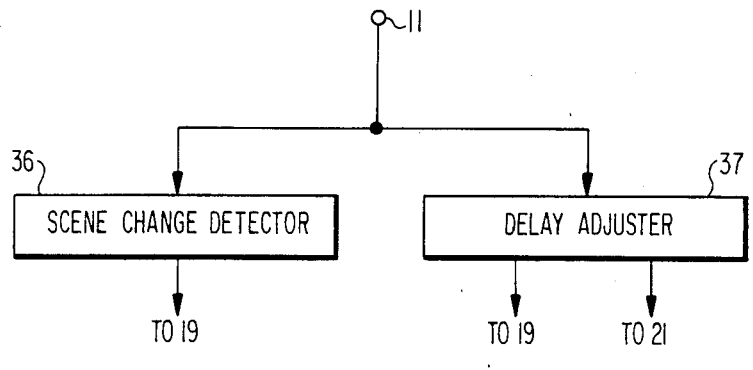
FIG. 5, drawn below FIG. 3 merely for convenience of illustration, is a fragmentary block diagram of a movement compensation predictive encoder according to a second embodiment of this invention.

Referring to FIG. 5, the description will proceed to a movement compensation predictive encoder according to a second embodiment of this invention. The encoder comprises a scene change detector 36 in place of the variation detector 16 and the temporary memory 18 which are described in conjunction with FIG. 3. The scene change detector 36 is of a known structure and is responsive to the input picture signal for detecting a scene change in one of the successive frames to produce a scene change signal whenever the scene change is detected in that one of the frames. For example, the scene change detector 36 may be operable in the manner described in an article contributed by Makato Miyahara to Transactions of the Institute of Electronics and Communication Engineers of Japan, Volume 56-A, No. 8 (August 1973), pages 456 to 463, under the title of "Measurement and Investigation of Frame Difference Signal Characterlstics for Band Compression" in literal translation. Briefly, the Miyahara article shows a method of detecting a scene change by calculating the numbers of significant frame differences and by deriving an interframe correlation of the numbers.

The scene change signal is supplied to the vector detector 19 described in conjunction with FIG. 3. On the other hand, the input picture signal is delivered to a delay adjuster 37 which is similar to the delay adjuster 17 described in connection with FIG. 3. The delay adujster 37, however, produces a first delayed picture signal with a delay in the scene change detector 36 alone and a second delayed picture signal with a delay which is equal to a sum of the delays in the scene change detector 36 and the vector detector 19. As in FIG. 3, the first delayed picture signal is supplied to the vector detector 19. The second delayed picture signal is supplied to the subtractor 21 (FIG. 3). A lead is coupled from the scene change detector 36 to the vector detector 19 for controlling the movement vector signal by giving a predetermined value to the displacements of the respective blocks in that one of the successive frames in which a scene change is detected.

Figure 6:
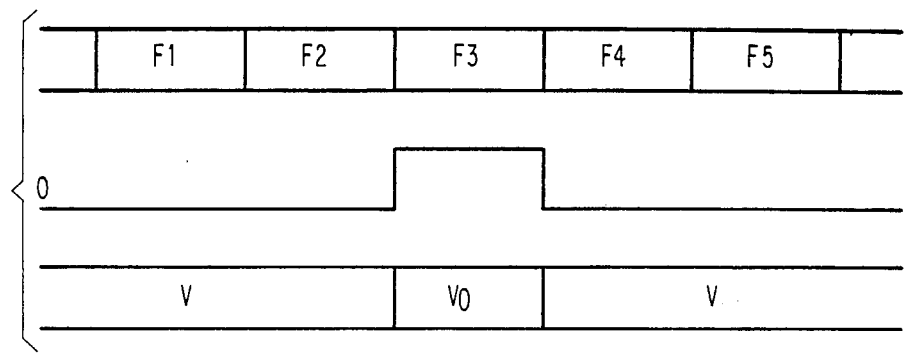
FIG. 6 is a diagram for use in describing a scene change detector used in the encoder shown in FIG. 5.

Referring to FIG. 6, first through fifth frames F1, F2, F3, F4, and F5 of an input picture signal are depicted along a first or top line. It will be assumed that a scene change takes place in the third frame F3. Like the variation signal described in conjunction with FIG. 3, the scene change signal may have a first and a second predetermined level in the manner depicted along a second or middle line when the scene change occurs and does not in each frame, respectively. In the example being illustrated, the scene change signal has a logic one level only during the third frame F3 and a logic zero level in the first, the second, the fourth, and the fifth frames F1, F2, F4, and F5. The vector detector 19 detects the movement or motion vectors as usual when the scene change signal has the second predetermined level. Only for the frame in which the scene change is detected, the scene change signal of the first predetermined level controls the movement vector signal by giving the predetermined value indicated at $V_O$ to the above-discussed displacements throughout the frame in question.

Figure 7:
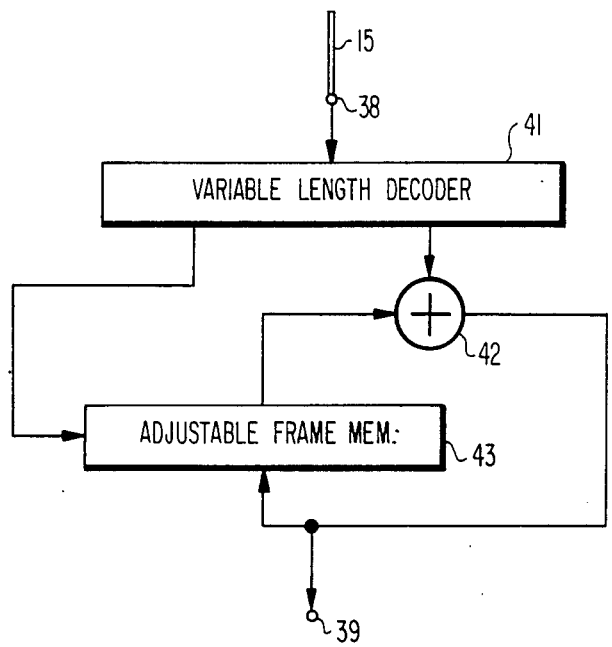
FIG. 7 is a block diagram of a decoder for use in combination with the encoder illustrated in FIG. 3 or 5.

Referring to FIG. 7, a decoder is for use in combination with the movement compensation predictive encoder which is illustrated with reference to FIG. 3. The encoder may also be that illustrated with reference to FIGS. 5 and 6. The decoder has a decoder input terminal 38 supplied with the rate matched signal through the transmission channel 15 which is depicted also in FIG. 3. The decoder produces a reproduction of the input picture signal of the encoder at a decoder output terminal 39 and comprises a variable length decoding circuit 41 which at first carries out matching of the transmission rate of the transmission channel 15 with a decoding rate of the decoder to produce a reproduction of the variable length encoded signal described in conjunction with FIG. 3. In the meanwhile, the variable length decoding circuit 41 decodes the reproduction of the variable length encoded signal into a reproduction of the prediction error signal and a reproduction of the movement vector signal.

The reproduction of the prediction error signal is delivered to an adder 42. The reproduction of the movement vector signal is delivered to an adjustable frame memory 43 as an adjusting signal. In the manner known in the art, the adder 42 delivers the reproduction of the input picture signal to the decoder output terminal 39 and to the adjustable frame memory 43. Responsive to the adjusting signal, the adjustable frame memory 43 carries out the movement compensation for the reproduction of the input picture signal delivered thereto and supplies the adder 42 with a reproduction of the movement compensation predictive encoded signal described in connection with FIG. 3.

Figure 8:
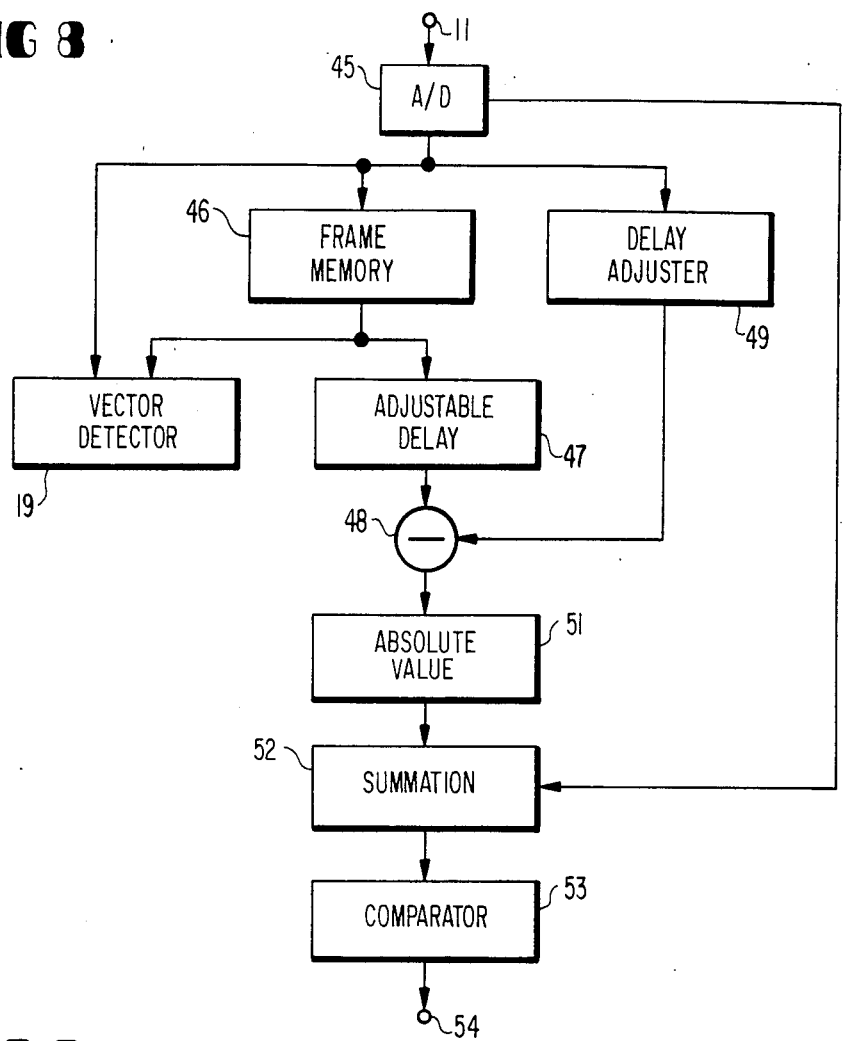
FIG. 8 is a partial block diagram of a movement compensation predictive encoder according to a third embodiment of this invention.

Referring now to FIG. 8, the description will further proceed to a movement compensation predictive encoder according to a third embodiment of this invention. It may be mentioned here in connection with FIGS. 5 and 6 that the scene change may be erroneously detected by the scene change detector 36 described before. This is because the frame differences become large when the television camera is panned or when a wide variation otherwise appears to render the absolute values of the frame differences large.

In FIG. 8, the encoder has an encoder input terminal which will again be designated by the reference numeral 11. The encoder comprises a vector detector which is not different from that described in conjunction with FIG. 3 and is designated by the reference numeral 19. It is now assumed that an input picture signal is an analog picture signal. From the encoder input terminal 11, the analog picture signal is delivered to an analog-to-digital (A/D) converter 45 and converted to a digital picture signal. The analog-to-digital converter 45 additionally detects a starting instant of each frame to produce a timing pulse indicative of each starting instant.

In the encoder, a frame memory 46 has a memory capacity of about one frame of the digital picture signal and produces a frame delayed picture signal. Although not depicted in detail in FIG. 3, the vector detector 19 is supplied with the digital and the delayed picture signals as picture signals of the current and the previous frames. The vector detector 19 produces the movement vector signal as an optimally predicted signal, which is delivered to an adjustable delay circuit 47 as an adjusting signal. The frame memory 46 delivers the delayed picture signal to the adjustable delay circuit 47. Responsive to the adjusting signal, the adjustable delay circuit 47 carries out movement compensation and delivers a movement compensated prediction signal to a subtractor 48. The digital picture signal is delivered to the subtractor 48 as a delay adjusted picture signal through a delay adjuster 49 with a delay which is equal to a sum of delays in the vector detector 19 and the adjustable delay circuit 47. The subtractor 48 subtracts the movement compensated prediction signal from the delay adjusted picture signal to produce a movement compensated prediction error signal representative of movement compensated prediction errors for the respective picture elements of the successive frames.

In other words, a combination of the adjustable delay circuit 47, the subtractor 48, and the delay adjuster 49 serves as a prediction error calculator responsive to the input picture signal and the movement vector signal for calculating a movement compensated prediction error for each picture elements of the current frame to produce the prediction error signal which successively represents the movement compensated prediction errors for the respective picture elements of the successive frames. The subtractor 48 corresponds to the subtractor 21 described in connection with FIG. 3. It should therefore be understood that the encoder comprises an encoding circuit in the manner described in conjunction with FIG. 3 and that the encoding circuit is for encoding the prediction error signal into a movement compensation predictive encoded signal, which may or may not be further encoded into a variable length encoded signal.

Supplied with the movement compensated prediction error signal, an absolute value calculator 51 calculates absolute values of the respective prediction errors to produce an absolute value signal representative of the absolute values. Reset by each timing pulse and supplied with the absolute value signal, a summation calculator 52 begins to calculate a summation of the absolute values for each frame to produce a summation signal representative of the summation. Supplied with the summation signal, a comparator 53 compares the summation with a preselected threshold T. As soon as the summation exceeds the preselected threshold T, the comparator 53 supplies a detector output terminal 54 with a scene change signal of a first preselected level, such as a logic one level. Otherwise, the detector output terminal 54 is supplied with the scene change signal of a second preselected level, such as a logic zero level. It is not understood in consideration of FIG. 3 that the scene change signal can be used in controlling the movement vector signal by giving a predetermined value to the displacements of the respective blocks of that one of the successive frames in which the summation exceeds the preselected threshold T.

In the manner described as regards the vector detector 19, a square calculator (not shown) can be substituted for the absolute value calculator 51. Responsive to the movement compensated predicition error signal, such a circuit element evaluates the movement compensated prediction errors to produce an evaluation signal, such as the absolute value signal, which successively represents results of evaluation of the movement compensated prediction errors for the respective picture elements of the successive frames.

In the example being illustrated, the analog-to-digital converter 45 is described to serve partly as a starting instant detector for detecting the starting instant of each frame to produce the timing pulse. A combination of the starting instant detector and the summation calculator 52 serves as a summing arrangement responsive to the evaluation signal for summing the results of evaluation from the starting instant of each frame into the summation to produce the summation signal successively representative of such summations for the respective frames. The comparator 53 serves as a scene change detector responsive to the summation signal for detecting a scene change in one of the successive frames when the summation exceeds the preselected threshold T. The scene change detector thereby produces the scene change signal of the first preselected level.

Figure 9:
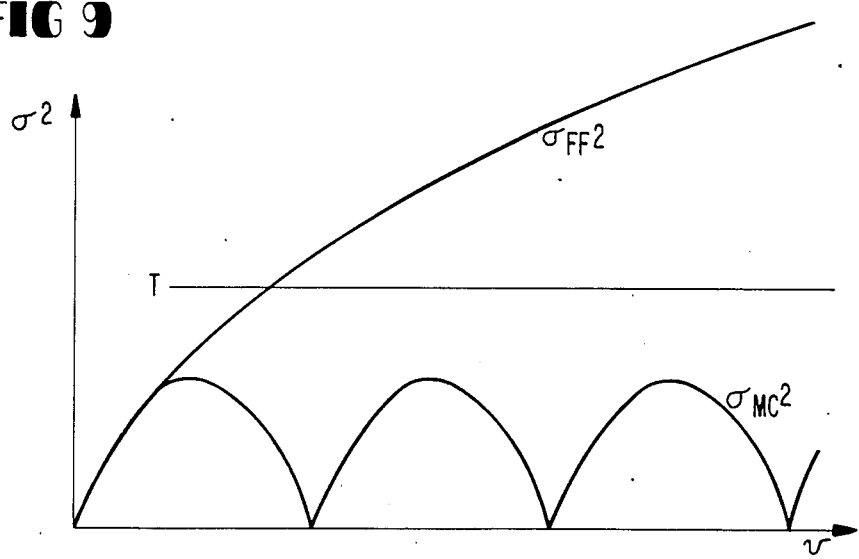
FIG. 9 is a schematic diagram for use in describing a scene change detector used in the encoder depicted in FIG. 8.

Finally referring to FIG. 9, the frame differences usually have a variance $\sigma_{FF}^2$ which is given by:

$$\sigma_{FF}^2 = 2\sigma_O^2 [1 - \exp(-\alpha |v|)].$$

where $\sigma_O{}^2$ represents an average electric power of the moving picture signal, v represents a speed of movement of an image or a picture portion between two consecutive frames, and $\alpha$ represents a parameter which depends on complicatedness of the pictures. The speed may be that of panning of a television camera. It is obvious from the above-given equation that the variance increases monotonously with the speed to approach an upper limit.

On the other hand, the movement compensated prediction errors ordinarily have a variance $\sigma_{MC}{}^2$ given by:

$$\sigma_{MC}{}^2 = 2\sigma_O{}^2 [1 - \exp(-\alpha |v-[v]|)],$$

where a pair of brackets is used as the Gauss' notation known in mathematics. The variance of the prediction errors therefore periodically decreases to zero at specific values of the speed. The specific values are equal to integral multiple of picture elements per frame. This is clear also from the fact that the prediction errors are equal to zero at such specific speeds.

When the interframe correlation is entirely lost as by a scene change, both the variances of the frame differences and of the prediction errors have a value which is approximately equal to the upper limit of the variance of the frame differences. Use of the frame differences therefore results in erroneous detection of the scene change as described above. On the contrary, the circuitry of FIG. 8 is unexpectedly correctly operable if the preselected threshold T is selected in the manner exemplified in FIG. 9.

While this invention has thus far been described in conjunction with a few preferred embodiments thereof, it will now be readily possible for one skilled in the art to carry this invention into effect in various other manners. For example, the prediction errors can be subsampled in the manner described in the Hirano et al patent referred to hereinabove.

What is claimed is:

1. A movement compensation interframe predictive encoder for a moving picture signal comprising successive frames, each consisting of a predetermined number of regions of picture elements, said encoder including vector signal producing means responsive to said moving picture signal for producing a movement vector signal representative of at least one movement vector for each region and encoding means for encoding said moving picture signal into a movement compensation interframe predictive encoded signal, wherein the improvement comprises:
   variation detecting means responsive to said moving picture signal for detecting a variation in each region from a previous frame to a current frame to produce a variation signal whenever the variation exceeds a predetermined threshold for one of the regions of said current frame; and
   controlling means coupled to said vector signal producing means and responsive to said variation signal for controlling said movement vector signal by giving a predetermined value to each movement vector in said one of the regions.

2. A movement compensation interframe predictive encoder as claimed in claim 1, wherein said variation detecting means comprises:
   means responsive to said moving picture signal for calculating a frame difference for each picture element between said previous and said current frames to produce a difference signal successively representative of the frame differences for the respective picture elements of said current frame;
   a significance discriminator responsive to said difference signal for discriminating between a significant and an insignificant difference as regards each frame difference to produce a discrimination signal successively representative of the significant and the insignificant differences for the picture elements of said current frame;
   summing means responsive to said discrimination signal for summing the significant and the insignificant differences into a summation for each region of said current frame to produce a summation signal successively representative of the summations for the respective regions of said current frame; and
   discriminating means responsive to said summation signal for discriminating whether or not said summations exceed a prescribed threshold which is determined in consideration of said predetermined threshold, said discriminating means thereby producing said variation signal whenever the summation exceeds said prescribed threshold for one of the regions of said current frame.

3. A movement compensation interframe predictive encoder for a moving picture signal comprising successave frames, each comprising picture elements, said encoder including vector signal producing means responsive to said moving picture signal for producing a movement vector signal successively representative of movement vectors for each frame and encoding means for encoding said moving picture signal into a movement compensation interframe predictive encoded signal, wherein the improvement comprises:
   scene change detecting means responsive to said moving picture signal for detecting a scene change in one of said successive frames to produce a scene change signal whenever the scene change is detected; and
   controlling means coupled to said vector signal producing means and responsive to said scene change signal for controlling said movement vector signal by giving a predetermined value to each movement vector in said one of the successive frames.

4. A movement compensation interframe predictive encoder as claimed in claim 3 said encoding means comprising prediction error calculating means responsive to said moving picture signal and said movement vector signal for calculating a movement compensated prediction error for each picture element of said current frame to produce a prediction error signal successively representative of the movement compensated prediction errors for the respective picture elements of said successive frames and means for encoding said prediction error signal into said movement compensation interframe predictive encoded signal, wherein said scene change detecting means comprises:
   an error evaluator responsive to said prediction error signal for evaluating the movement compensated prediction errors to produce an evaluation signal successively representative of results of evaluation for the movement compensated prediction errors of said successive frames;
   summing means responsive to said evaluation signal for summing the results of evaluation from a starting instant of each frame into a summation to produce a summation signal successively representative of the summations for said successive frames; and scene change detecting means responsive to said summation signal for detecting the scene change in said one of the successive frames to produce said scene change signal when the summation exceeds a preselected threshold.

* * * * *

UNITED STATES PATENT AND TRADEMARK OFFICE
CERTIFICATE OF CORRECTION

PATENT NO. : 4,689,673

DATED : August 25, 1987

INVENTOR(S) : Junichi Ohki; Akihiro Furukawa

It is certified that error appears in the above-identified patent and that said Letters Patent is hereby corrected as shown below:

Column 7, line 45, delete "predetermlned" and insert therefor --predetermined--.

Column 8, line 12, delete "characterlstics" and insert therefor --characteristics--.

Column 10, line 33, delete "not" and insert therefor --now--.

Signed and Sealed this

Twelfth Day of July, 1988

Attest:

DONALD J. QUIGG

*Attesting Officer*    *Commissioner of Patents and Trademarks*